(No Model.) 6 Sheets—Sheet 1.

C. A. JUENGST.
CASH REGISTER AND INDICATOR.

No. 499,294. Patented June 13, 1893.

Witnesses
E. H. Rowland
Chas. Hanmann

Inventor
Chas. A. Juengst
by
Geo. H. Graham atty.

(No Model.) 6 Sheets—Sheet 4.
C. A. JUENGST.
CASH REGISTER AND INDICATOR.

No. 499,294. Patented June 13, 1893.

Witnesses
E. Rowland
Chas Hanimann

Inventor
Charles A. Juengst
by Geo. H. Graham
Atty.

(No Model.)  6 Sheets—Sheet 5.

C. A. JUENGST.
CASH REGISTER AND INDICATOR.

No. 499,294. Patented June 13, 1893.

WITNESSES:
S. Rowland
Chas. Hanmann

INVENTOR
Charles A. Juengst
BY
Geo. H. Graham
ATTORNEY (No Model.)

C. A. JUENGST.
CASH REGISTER AND INDICATOR.

No. 499,294. Patented June 13, 1893.

WITNESSES:
H. Marler
Chas Hanimann

INVENTOR
Charles A. Juengst
BY
Geo. M. Graham
ATTORNEY

UNITED STATES PATENT OFFICE.

CHARLES A. JUENGST, OF CROTON FALLS, NEW YORK, ASSIGNOR, BY MESNE ASSIGNMENTS, TO THE LAMSON CONSOLIDATED STORE SERVICE COMPANY, OF BOSTON, MASSACHUSETTS.

CASH REGISTER AND INDICATOR.

SPECIFICATION forming part of Letters Patent No. 499,294, dated June 13, 1893.

Application filed September 24, 1890. Serial No. 366,034. (No model.)

*To all whom it may concern:*

Be it known that I, CHARLES A. JUENGST, a citizen of the United States, residing at Croton Falls, in the town of North Salem, county of Westchester, and State of New York, have invented certain new and useful Improvements in Cash-Registers, of which the following is a specification.

This invention relates to that class of cash registers wherein a plurality of keys of different values are employed to effect the operation of a registering device by which the sums of the values of the keys operated are preserved, and to effect the display of an indicator or indication agreeing in value to the key operated.

The present invention has for its object to improve the construction and operation of cash registers whereby they are rendered more effective and less liable to become inoperative through rough handling or adroit manipulation for defrauding purposes.

To this end the improvement consists in providing a novel coupler to which one or more of the operating keys may become connected as soon as they are moved from their normal positions.

They further consist is providing an arrester common to a number of keys by which their movements are controlled or by which they are required when once moved to make a complete stroke.

They furthermore consist in novel structures and combinations of parts fully hereinafter set forth, reference being had to the accompanying drawings, in which—

Figure 2:
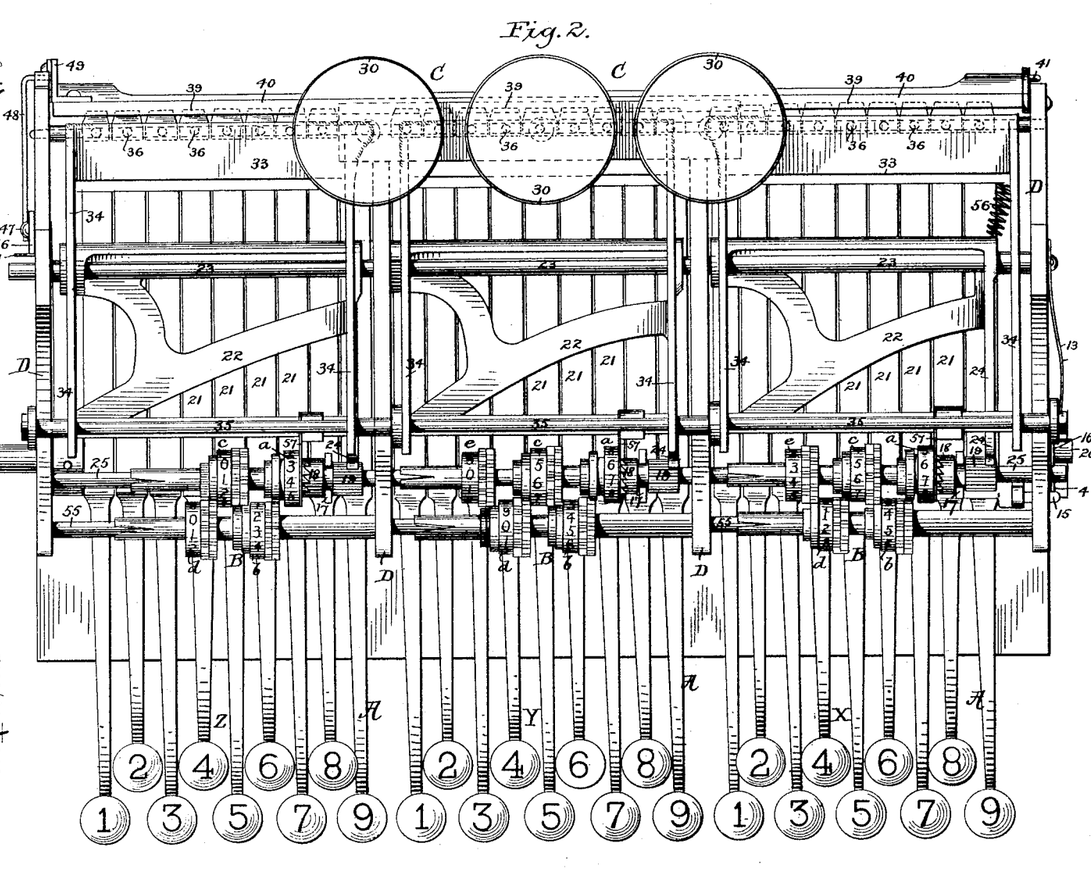
Fig. 2, a plan view thereof.

The register as illustrated consists essentially of a plurality of keys A, of different values, a registering device B adapted to be operated upon the movement of the keys to preserve the sums of their values, and an indicator C also adapted to be operated upon the movement of the keys to indicate the value of the key operated. The register embracing these three instrumentalities is shown as combining three distinct sets thereof adapted to register and indicate for instance units, tens and hundreds of cents. The set at the right of Figs. 2 and 3 may be said to represent the units of cents bank X for registering and indicating one to nine cents inclusive; the central set the tens of cents bank Y for registering and indicating ten to ninety cents inclusive, and the left hand set the hundreds of cents or dollars bank Z for registering and indicating one to nine dollars inclusive. It is to be distinctly understood however, that so far as many of the improvements hereinafter set forth are concerned the register may consist of one or more sets of said instrumentalities adapted to register, or indicate, (or both) any desired values whether said set represents units, tens or hundreds of any denomination or a combination thereof as units and tens, or tens and hundreds.

So far as the construction and operation of the several sets of instrumentalities are concerned they are shown to be the same and hence a description of one set will suffice for all; and where certain single parts are shown to be common to the several sets it will be so stated in describing their function and operation.

The several instrumentalities are mounted in a suitable frame-work D, which in practice will be inclosed by a case, not shown, leaving the outer ends of the keys exposed for operation and providing sight openings for reading the indicator and the sums of the registering device. The keys A are in the form of levers all pivoted loosely side by side upon a common fulcrum rod 20 extending longitudinally of the machine frame, and bearing at their outer ends finger pieces having numerals delineated thereon indicating their values; which keys are adapted to be rocked to effect the operation of indicating and registering.

The particular structure of indicating device employed may be varied within wide limits; that shown consisting of a vertically arranged drum 30, one for each set of instrumentalities, mounted at the upper end of a vertical spindle 31 that is guided in bearings 32 supported from the frame work. The lower end of the drum-spindle extends just above a movable bar 33 that is supported at the rear ends of a pair of arms 34 that are loosely pivoted at their front ends upon a rod 35 supported by the frame work. The movable bar 33 is of a length suited to be borne against by a plurality of projections from the keys, or as shown by a plurality of intermediate rods 36.

Figures 1, 9:
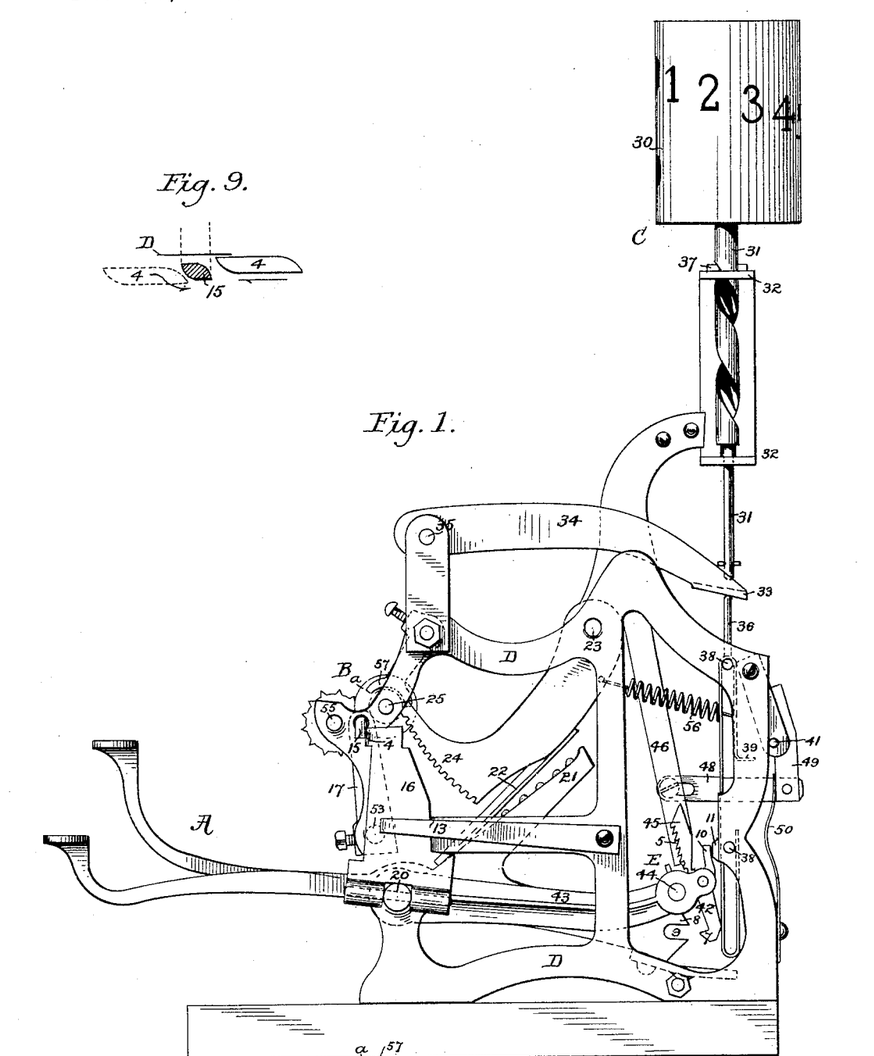
Figure 1, is a side elevation of a cash register.
Fig. 9 is an enlarged diagrammatic view of some of the same parts.
Figure 3:
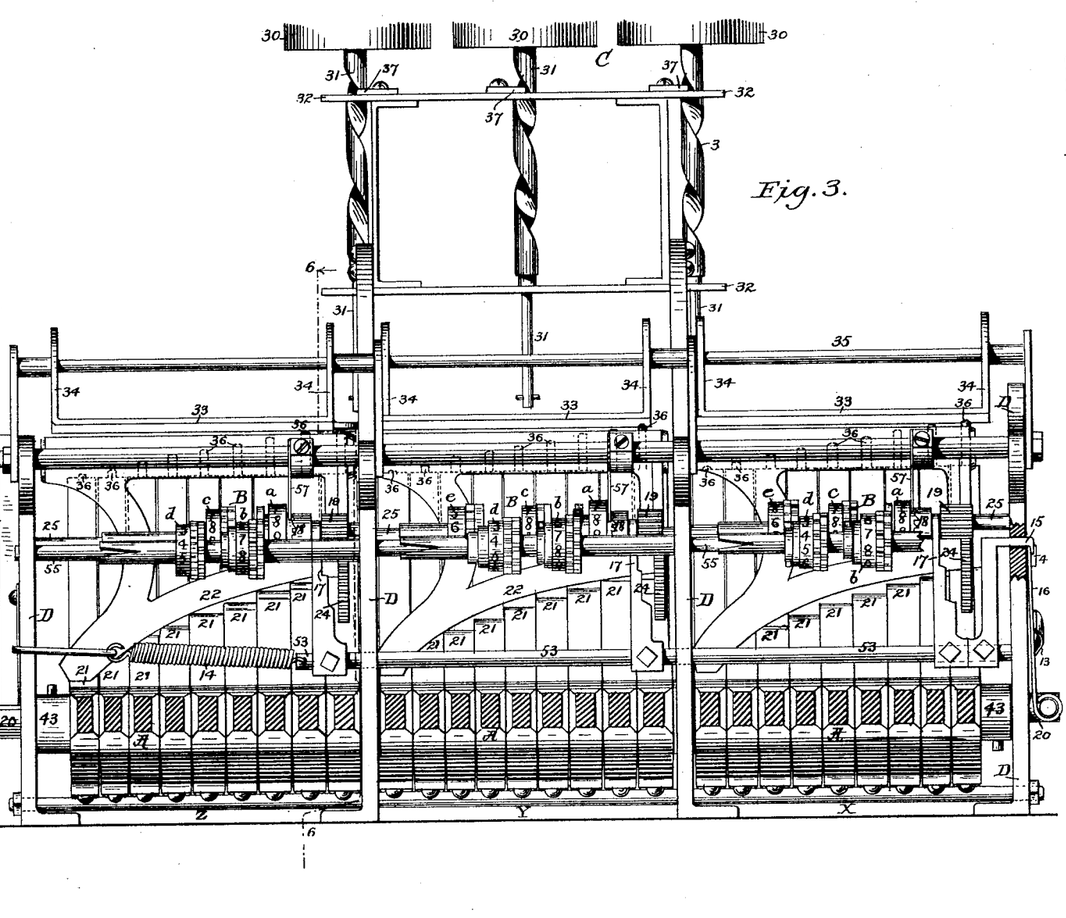
Fig. 3, a front elevation, the forward end of the keys being in section.
Figure 4:
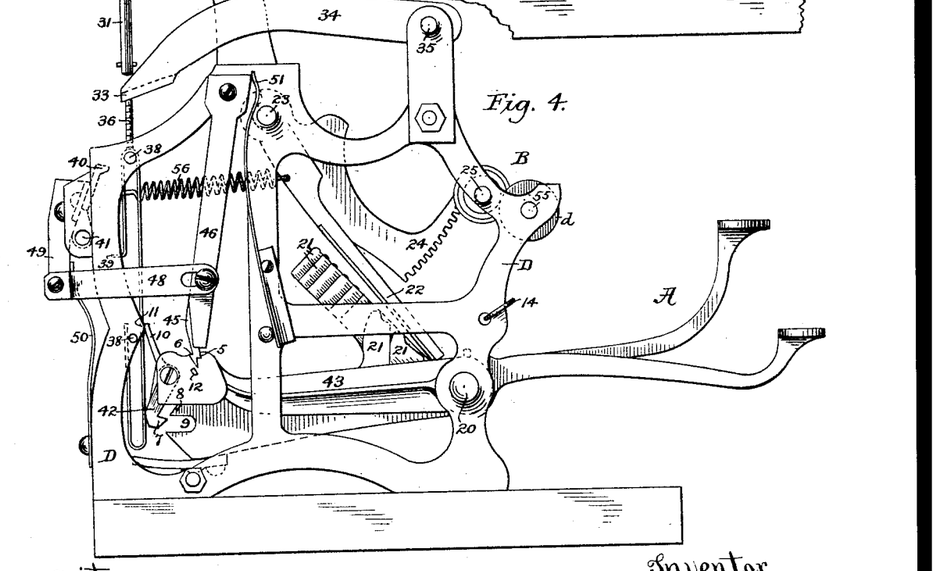
Fig. 4, is a side elevation looking from the opposite side to that seen in Fig. 1.

The indicating numerals are arranged upon the drum 30 preferably in a spiral direction around the same, so that in the normal position of the parts as shown in Figs. 1, 3 and 4 the zero at the upper portion of the drum will show through the usual sight opening. In order to cause the drum to partially rotate as it is elevated by the movement of the bar 33 the drum spindle 31 is for a portion of its length formed with a quick spiral groove in which takes a nut 37 secured to the support 32.

Figure 5:
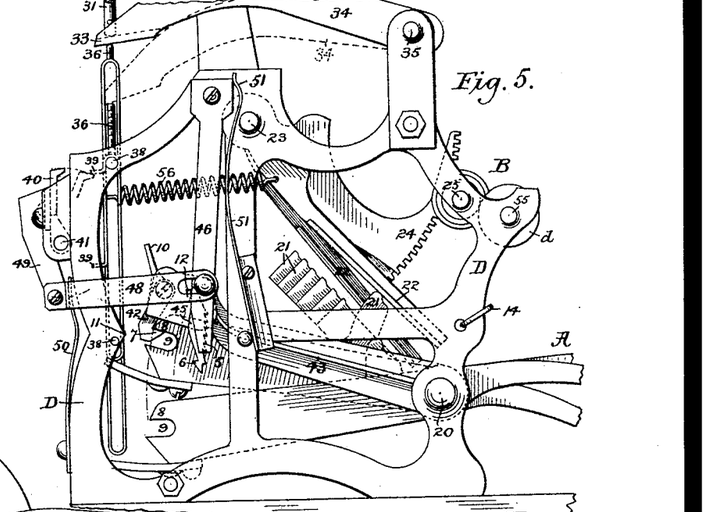
Fig. 5, is a similar view of a portion of the parts seen in Fig. 4, showing the position of some of the parts during the movement of a key.
Figure 6:
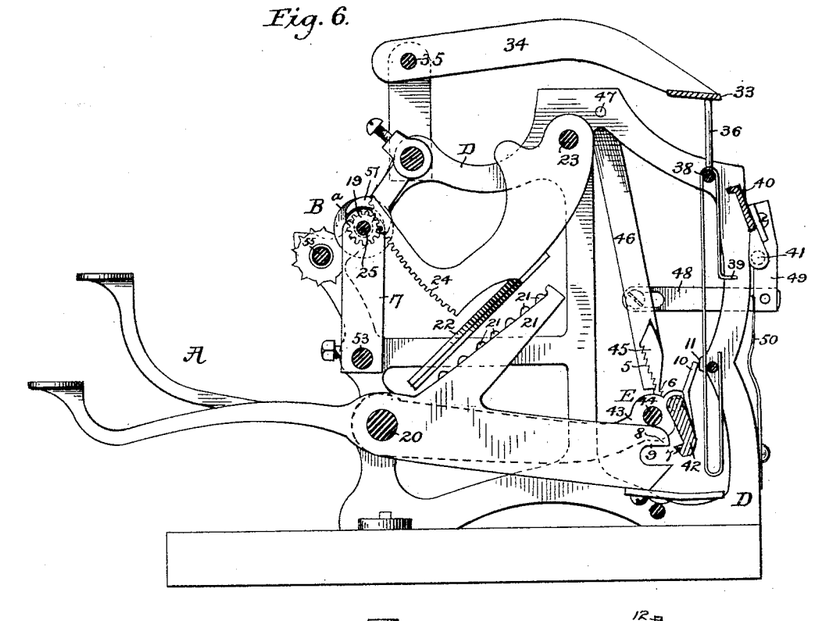
Fig. 6 is a cross sectional elevation taken on the line 6, 6, of Fig. 3.
Figure 7:
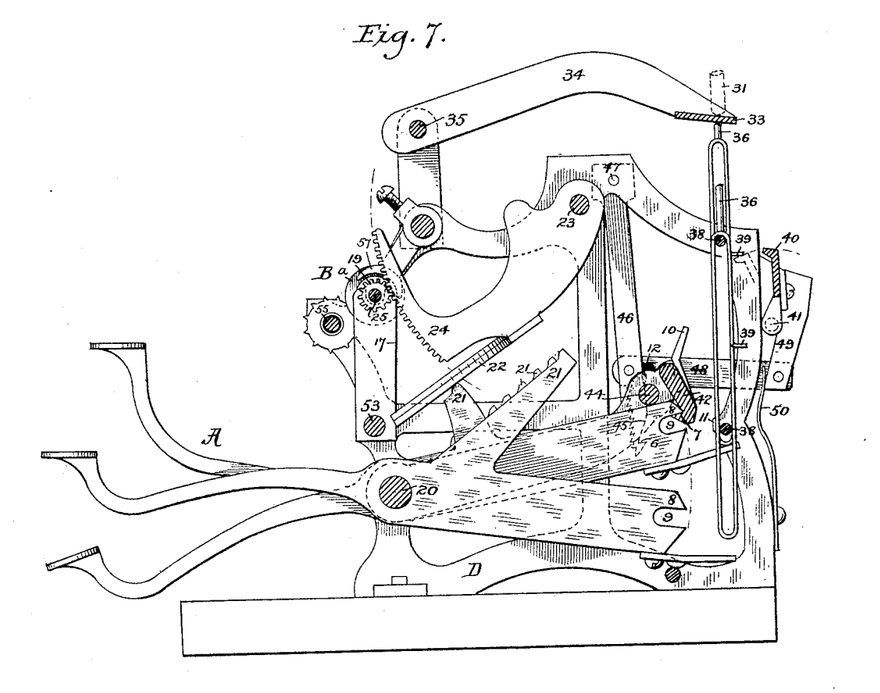
Fig. 7 is a similar view, the parts being shown in their moved position as in Fig. 5.
Figure 8:
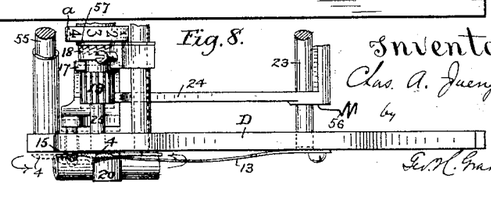
Fig. 8 is a detail plan view of a portion of the registering devices particularly the means for disengaging the clutch.
Figure 10:
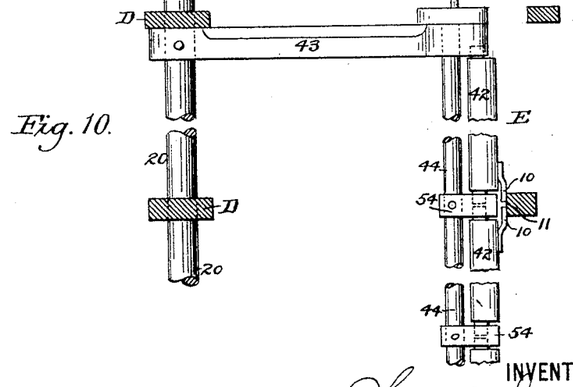
Fig. 10 is a plan view of a portion of the coupling device, the keys and other mediate connections being omitted.

The intermediate rods 36, one for each key, are arranged at the rear of the machine to slide vertically in bearings provided by the frame work. These rods are of graduated lengths suited to the distance it is required to move the bar 33, to cause the indicator drum to be elevated and rotated to expose the proper indication through the sight opening, it being understood that the operative stroke of all of the keys is a constant and equal one in the present organization. The intermediate rods are formed of strip material, at each end doubled back upon itself to straddle a pair of fixed guides 38 the end of the upper doubled portion terminating in a horizontal rearward projection 39. Coacting with these projections 39 is a vibrating wing 40 arranged at the rear of the machine upon horizontal pivots 41, and common to all of the keys in the machine, that is to say to the three sets of keys shown. The normal position of the wing 40 is shown in Figs. 4 and 6 and by dotted lines in Figs. 5 and 7 holding by its projection 39 one of the intermediate rods 36 in its raised position. The wing is adapted to be rocked rearward upon the movement of any key to permit a previously raised intermediate rod to return to its lower position and the indicator to zero, and to allow another or the same rod to be raised, by connections preferably with some moving part of the machine to be hereinafter explained; although it is obvious the wing might be rocked rearwardly by the passage of a projection 39 behind it in the act of raising a rod 36.

In machines of this class, as heretofore generally constructed, it has been necessary, when a sale requiring the operation of two or more keys was to be indicated as registered, to start the several keys at substantially the same time and press all of them down together, giving each a full stroke by pressure applied directly to it. In such machines, even if the several keys were started at the same time the operator was liable, especially where more than two keys were being operated at once, to accidentally release one of them, in which event the released key would drop back to normal position and its value would not be indicated and registered. This difficulty I have overcome in my present machine by providing what I term a key coupler, to-wit, a device co-operating with the keys in such manner that when any two or more keys are simultaneously displaced from normal position, or started, they will become connected to this device and thereby coupled together, so that thereafter they are obliged to move together during the remainder of their stroke, the result being that all but one may be released and all be carried down by pressure applied to that one alone, and the values of all be properly indicated and registered. Again, in machines of this class as heretofore constructed it was not only necessary that each operated key should be given a full stroke by pressure applied directly to such key, but where a sale was to be registered requiring the operation of two or more keys, it was necessary in most cases that the several keys should be started and given their full strokes at substantially the same time. Where the amount to be registered required the operation of three keys, for instance, as would often be the case where the sale exceeded one dollar and included odd cents, or where the amount required the operation of four keys, as when it exceeded ten dollars and included odd cents, it was often difficult for the operator to reach the necessary keys with the span of his two hands, and even when he could reach them it was difficult for him to simultaneously depress them, and his fingers were very liable to slip off one or more of them. This difficulty I have overcome in my present machine by providing a key-coupler of such character, and co-operating with the several sets of keys in such manner, that a key in one set may be slightly depressed or started and thereby connected to the coupling device, then a key in another set be so started and connected to such device, and then a key in the third set (and so on, if there are more than three sets of keys), and then all of said slightly depressed keys in the several sets be carried down and their operation completed by pressure upon any one of them alone. In this manner it is possible, when a sale amounting to dollars, tens and units of cents is made, to properly indicate and register it by tapping or slightly depressing the proper dollar key or keys, then the proper tens of cents key, and then pressing the proper units of cents key all the way down—all with one hand. My key-coupler device is furthermore of such character that its function in coupling together simultaneously started keys is distinct from its function of coupling together successively started keys, and it may be employed for either purpose independently of the other; all as will be hereinafter explained.

The key coupler or coupling device E to be presently described also provides a convenient means for controlling the movement of the keys in requiring that each key, after it has once been moved from its normal position, be moved through its full stroke or movement either in only one direction or in both directions, and in performing this function the device may act both as a coupler and a controller, or it may act solely as either a coupler or controller, its other function being entirely absent or performed by an independent device.

My key-coupling device consists primarily of a bar or frame extending across the keys and movable with them throughout their strokes, and means for automatically coupling the operated key or keys to this bar or frame. These are the only elements necessary to the coupling of simultaneously started keys, but for the purpose of coupling successively started keys to such movable bar or frame there is employed means for holding the slightly depressed key or keys in such position while the remaining keys are being started, so that when a key is started and released it will not return to normal position but will remain sligtly depressed and connected to said movable bar or frame. First, the coupling of simultaneously started keys: Secured to the fulcrum-shaft 20 of the key levers A, one at each end of said shaft, are two rearwardly-extending arms 43, Figs. 1, 3, 4, 5, 6, 7 and 10. These arms are rigidly connected by a cross rod or bar 44 overlying the keys of all the sets and resting upon or in close proximity to their upper sides near their rear ends, Fig. 6. The arms 43 and rod 44 thus constitute a rigid swinging frame having the shaft 20 as its pivot and adapted to be lifted by and move with any operated key. Loosely hung in this frame at its rear side are the three coupling bars 42, the left hand one being loosely pivoted at its outer end in the rear end of the left hand arm 43 of the frame, and at its inner end in a support 54 rigidly secured to and projecting rearwardly from the rod 44 of the frame, Fig. 10; the middle bar 42 being mounted at one end in the same support 54 and at its other in a second similar one also secured to the rod 44; and the third or right hand bar 42 being mounted at one end in said last mentioned support 54 and at its other in the right hand side arm 43 of the frame. Each of these bars 42 extends across the rear end of one set of keys, the bars being each of approximately the same length as the width of the space occupied by one set of keys. The three bars, as will be seen, are free to swing independently of each other in their bearings in the frame. Each bar is provided at its lower edge with a forwardly projecting flange 7, having an abrupt upper surface, and a beveled lower and forward edge, Fig. 6, the bar in cross-section forming a swinging hooked pawl. These bars 42, or the flanges 7 at their lower edges, are adapted to co-operate with recesses 9 formed in the rear ends of the key levers A. The pivotal support and position of the bars are such that, if unrestrained, they would gravitate forward and their flanges 7 enter the recesses 9 in the key levers, but when the parts are in normal position the bars 42 are held tilted rearward, in the position shown in Fig. 6, by means of plates 10 secured to the bars and resting at their upper ends against cam surfaces 11 upon the framework; Figs. 1, 4, 6 and 10. Under this construction and arrangement of the parts it will be seen that when the front end of any key lever is slightly depressed its rear end will lift the rod 44 and rear side of the swinging frame, thereby carrying the plates 10 of the bars 42 above and away from the cam surfaces 11, and permitting all of said bars to swing forward. The flange 7 on the bar 42 which belongs to the set containing the depressed key will enter the recess 9 in the rear end of such key and thereby attach the key to the swinging frame, locking its portion 8 (above the recess 9) between the rod 44 and the flange 7 of the bar 42. The remaining bars 42 will also swing forward, as above stated, and their flanges 7 will swing over or rest against the rounded rear edges of the portions 8 of the keys in their respective sets. If now the slightly depressed key be held in such position while a key in another set is also slightly depressed the rounded surface of the part 8 of such second key, as it rises, will swing back the bar 42 belonging to such set until it clears the flange 7 of such bar and its recess 9 comes opposite such flange, whereupon the bar will swing forward again and its flange will enter the recess, and thereby couple said second key to the swinging frame. A third key in the third set may be coupled to the frame by the third coupling bar 42, in the same manner, and then all of said keys may be carried down and their operation completed by fully depressing the front end of any one of them.

Under the construction thus far described, if two or more keys in different sets be simultaneously started they will all become coupled to the swinging frame, and then all of them excepting one may be released and the operation of all completed by fully depressing that one. The parts thus far described thus constitute a complete and effective coupling device for coupling simultaneously started keys, and, indeed, for this purpose all three of the bars 42 might be merged into a single bar hung in the swinging frame. The purpose of providing a separate bar 42 for each set of keys is to enable keys in the different sets to be successively depressed and coupled to the swinging frame, in the manner described. If a single bar 42, common to all the sets of keys, were employed, the depression of a second key, after a first had been slightly depressed and caught upon the bar, would be liable to release the first mentioned key and permit it to drop back to normal position, whereas by the use of three independent coupling bars carried by a single frame the depression of a second key does not affect the connection of the first key with said frame. (From the description of the registering mechanism hereinafter, and that of the indicating mechanism already given, it will be understood that in my present machine only a single key in any given set is depressed at one operation, two or more in the same set never being depressed, either simultaneously or successively, at the one operation.)

As above described, in order to successively couple keys in different sets it is necessary that the first key started should be held in its slightly depressed position while the succeeding keys are coupled to the swinging frame, for if the first key be released it and the frame will at once drop back to normal position and become uncoupled. The operator may hold the first key slightly depressed with one hand while he depresses a second key in another set, and a third key in a third set if necessary, and thus successively couple two or more keys and complete the operation of all by fully depressing the first or any other one of them; but this involves the use of both of the operator's hands, and I prefer that the machine be capable of having the keys in the several sets successively coupled with one hand, by simply starting one and then another and another, and then fully depressing any one of them. To that end it is necessary to add to the devices thus far described some means for automatically arresting a slightly depressed key and preventing its return to normal position when released. In the present machine I have provided such means in the form of an arresting device or controller applied to the swinging frame and co-operating therewith in such manner as to automatically arrest it and prevent its return to normal position when it has been slightly lifted and released by the starting and release of a key. Inasmuch as the started key is coupled to this frame the key will also be held from return. In this arresting of the swinging frame there co-acts an arrester consisting of an arresting plate 45 with which engages a pin or projection 12 that projects from the side of one of the arms 43—see Figs. 4, 5 and 10. The arresting plate 45 is fixed to the inner side of a vibrating arm 46 that is hung from a pivot 47 at the left hand end of the frame work, which arm is in turn connected by a link 48 with the vibrating wing 40 through an arm 49 forming an extension of the wing upon one side of its pivot so that when the arm 46 is moved the wing is also moved. A spring 50 bearing against the arm 49 yieldingly holds the wing 40 in normal position, and, through the link 48, also yieldingly holds the arm 46 and arrester plate 45 in proper position against the pressure of a spring 51 bearing against the forward edge of the arm 46 at its upper end. The arresting plate 45 is thus mounted to yield slightly with respect to the arc of vibration of the projection 12 of the coupling bar, so that after moving against one side of the plate in one direction it may readily pass to the opposite side of the plate in its return movement; and the plate is shaped to provide one or more serrations as 6 upon its rear side permitting only an upward movement of the projection on that side and with like serrations or as shown a series of serrations 5 upon its opposite side which permit only a reverse movement of the projection. The serration or tooth 6 upon the rear side of the plate is located a sufficient distance above the normal position of the projection 12 that a key and the coupling bar may move into engagement before the projection 12 passes above the tooth 6, after which, if the key be released, it and the swinging frame will drop back until the projection 12 engages the tooth, which will arrest them and hold the key in a slightly depressed position. A second key in another set can then be depressed and coupled to the swinging frame, in the manner heretofore described, and a third in another set, and so on, as will be readily understood. The rear side of the arresting plate 45 is of cam shape so that the projection 12 in riding up in contact therewith will vibrate the arm 46 and thus rock the wing 40 rearward, to release a previously raised intermediate rod 36, against the pressure of the spring 50 acting against the heel of the arm 49 of the wing. The connection between the vibrating arm 46 and link 48 is a slotted one so that the arm may vibrate rearwardly independent of the link, and against the pressure of the spring 51, upon the downward movement of the projection 12 of the coupling device in passing along the front side of the arresting plate 45.

From the foregoing it will be understood that as soon as one or more keys become coupled with the coupling bar, their further movement will be controlled by the arresting plate 45, whose serration 6 coacting with the projection 12 prevents them from being returned to their normal position before making a complete stroke in one direction, and which, upon passing to the opposite side of the arresting plate in the return movement of the key and coupling bar meets the serrations 5 which prevent their upward movement until they have first resumed their normal positions. Thus, the complete exposure of an indication is insured, and, as will hereinafter appear, a complete and proper movement of the registering device is also insured.

It is obvious that the construction and arrangement of the parts constituting my key coupling devices may be widely varied without departing from my invention, whether they be employed for coupling simultaneously started keys, or successively started ones, or both.

So far as I am aware I am the first in the art to combine a series of keys with a coupling contrivance of any sort to which a displaced key may become connected and by which two or more displaced keys may be coupled together and compelled to move in unison; as well as the first to combine a series of keys with a coupling contrivance of any sort to which successively started keys may become coupled and caused to move together, in the manner described; and my invention in these respects is limited only by the terms of my respective claims in which it is expressed.

I am aware that it has heretofore been proposed to combine arresting devices of various sorts with the keys of machines of this class, for the purpose of compelling full strokes of the operated keys, but I believe I am the first in the art to combine a series of keys with a movable bar or frame to which they become coupled in any manner when displaced from normal position, and means of any sort for compelling a full movement of such bar or frame in either one or both directions, and I desire to secure the same as my invention, without regard to the particular construction or arrangement of the devices employed.

It will be understood, as heretofore stated, that the functions of the key-coupling devices, as such, is distinct from their function as part of the key-controlling or arresting devices, and that they may be employed for the one purpose independently of the other. Thus, as part of the key-controlling apparatus the devices for coupling or connecting a displaced key to the movable bar or frame with which the arresting devices co-operate may be employed in a machine in which it is not necessary or possible to operate two keys simultaneously, and in which, therefore, there need or could be no coupling together of displaced keys.

*The registering device.*—The keys are each provided with an upwardly extending arm 21 of different or graduated lengths, the key of the lowest value having the shortest arm and that of the highest the longest arm. These arms are in position to bear against and upon the movement of the key to move a register actuating bar or lever 22 having a connection with the registering device B; there being an actuating lever with each set of keys, each lever movable independent of the other. The register actuating lever 22 consists of a lever frame pivotally hung at its rear upon a rod 23 and at its front having a bearing consisting of an angularly arranged plate extending longitudinally the width of the keys of a set, and in position to be borne against by the different length arms 21 of the keys as before explained; the arm of the greatest length moving the actuating lever the greatest distance while the shortest arm moves said lever the smallest distance, the intermediate length arms moving the lever a corresponding distance. The actuating lever normally occupies the inclined position shown, and held in such position by a spring 56, and carries means for imparting its different degrees of movement to the registering device B whereby the value of the sum of the movements will be preserved, and may be read from time to time. These means will obviously vary as the style of registering device that may be employed is varied, and may consist of a pawl engaging a ratchet forming part of or in turn moving the registering device, or a rack engaging a toothed wheel forming part of or in turn moving the registering device; said pawl and ratchet, and rack and toothed wheel being manifest equivalents and are adapted to be moved in unison with the actuating lever described whether directly or indirectly connected thereto. In the preferred construction the actuating lever carries upon one end a rack 24 of segmental form engaging a toothed wheel 19 that is mounted loosely upon a shaft 25 at the front of the machine. The toothed wheel 19 forms part of or is connected with the registering device B which may be of any suitable character, but as herein shown consists in a units dial wheel $a$, mounted loosely upon the shaft 25 and a series of higher dial wheels $b$, $c$, $d$, $e$, representing respectively tens, hundreds, thousands and tens of thousands each of said dial wheels being connected to the next higher dial wheel by the well known Geneva-movement, not necessary to be specifically described. The dial wheels $b$ and $d$ are however, mounted loosely upon a supplemental shaft 55, while the other wheels $c$, $e$, are loosely mounted upon said shaft 25. The periphery of each of these dial wheels will carry registering numerals from 1 to 9 and 0, so that the sum of the movements imparted to them through the segmental rack and pinion 19 can be read in the usual manner through sight openings provided in the inclosing case, but not shown. As the registering device is more liable to irregular and violent manipulation upon the first stroke of the keys—in the present instance upon their being depressed—it has been found desirable to provide for the movement of the registering device upon the reverse movement of the keys when they act automatically—either under spring pressure, weight or gravity—to return to their normal positions without the aid of the attendant. To this end, and at the same time obviate the necessity of disengaging the actuating bar from the prime mover of the registering device, as for instance the toothed wheel 19, there is provided a clutch 18 between said wheel 19 and the first dial wheel of the register, one part carried by the wheel 19 and the other part by said first dial wheel; the parts of the clutch being automatically moved out of engagement during the first part of the stroke of the keys and into engagement during the remainder thereof, so that the forward movement of the actuating bar will be an idle one, while its return movement will cause the proper amount, corresponding to the extent of movement imparted to said bar, to be added to the register. The disengagement of the parts of the clutch 18 is effected by a longitudinally moving rod 53 mounted in bearings at the front of the frame work that is provided with a fork 17 engaging with the movable part of the clutch; in this case there being three such forks, one for each clutch of the sets of registering devices. The slight longitudinal movement of the clutch disengaging-rod 53 necessary for this purpose is effected by some moving part of the machine, common either to all of the keys or to one set of the keys, as for instance the oscillation of the fulcrum rod 20, upon the movement of the coupling device E. Thus the outer right hand end of the fulcrum rod carries an upright arm 16, pivoted loosely thereto so as to swing to and from the side frame under the force of a spring 13. The upper end of the arm 16 is formed with a cam 4 that is adapted to engage in the oscillation in one direction of the fulcrum rod and said arm 16 with the rear side of the end of an arm 15 that extends from the disengaging rod 53 and through an opening in the side of the frame. In the return oscillation of the fulcrum rod and arm 16 the cam passes to the outside of the end of the arm 15 and thus returns idly, in the manner indicated by the full and dotted lines Fig. 9. In the operation of these various devices, upon the movement of a key and hence the coupling device E, the fulcrum rod is oscillated so that the cam 4, at the commencement of the stroke of the key, disengages the parts of the clutch 18 whereby the rotation of the toothed wheel 19 in one direction will be an idle one. The cam 4 is of sufficient length to hold the clutch disengaged during the movement of the key in one direction, but at the end of said movement will pass from engagement with the end of the arm 15 thereby releasing it and allowing the spring 14 to move the disengaging rod 53 back to its normal position moving the parts of the clutch into engagement, so that upon the return movement of the key and of the actuating lever 22 under the force of its spring 56, the then reverse rotation of the toothed wheel 19 will be communicated to the dial wheel $a$, of the registering device. During this return movement of the key and that of the coupling device, the cam 4 will pass idly to the outside of the end of the cam 15 to its normal position ready upon another movement of a key to again move the disengaging rod 53. It is to be understood that each time said rod 53 is moved by the cam each of the toothed wheels 19 of the several registering devices will be simultaneously disengaged from the dial wheels $a$, which are each held in place against sliding upon its shaft 25 by a forked finger 57, so that the single cam 4 will suffice for each set of devices, thus permitting two or more keys of different sets to be operated simultaneously.

Figure 11:
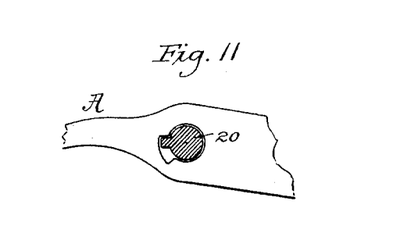
Fig. 11 is a detail view showing a key lever mounted on a shaft which is the common fulcrum for all the key levers.

Instead of oscillating rod 20 through the coupling device, it may be oscillated direct by each key, see Fig. 11.

What is claimed is—

1. In a register, the combination with a plurality of keys, of a coupler to which one or more of the keys may become locked upon being moved from their normal position, substantially as described.

2. In a register, the combination with a plurality of keys, of a vibrating coupler to which one or more of the keys may become locked upon being moved from their normal position, substantially as described.

3. In a register, the combination with a plurality of vibrating keys, of a coupler vibrating on an axis coincident with that of the keys and to which one or more of the keys may become locked upon being moved from their normal position, substantially as described.

4. In a register, the combination with a plurality of keys, of a coupler to which one or more of the keys may become connected upon being moved from their normal position and means for moving the coupler from the key or keys at the completion of its or their stroke, substantially as described.

5. In a register, the combination with a plurality of keys, of a vibrating coupler to which one or more of the keys may become locked upon being moved from their normal position, and means for rocking the coupler from the key or keys at the completion of its or their stroke, substantially as described.

6. In a register, the combination with a plurality of keys, of a coupler to which one or more of the keys may become connected upon being moved from their normal position and a bar extending across the keys and through which the coupler is moved, substantially as described.

7. In a register, the combination with a plurality of keys, of a coupler to which one or more of the keys may become connected upon being moved from their normal position, a bar extending across the keys and through which the coupler is moved and means for moving the coupler from the key or keys at the completion of its or their stroke, substantially as described.

8. In a register, the combination with a plurality of keys, of a coupler adapted to be moved from its normal position by the operation of one or more keys which become connected with the said coupler as soon as displaced from their normal position and a movable key coupler support to which the said key coupler is connected, substantially as set forth.

9. In a register the combination with a plurality of keys, of a coupler to which one or more of the keys may become connected upon being displaced from their normal position, a bar extending across the keys and by means of which the coupler is moved, and an arrester for compelling the displaced keys to make a complete stroke before returning to their normal position, substantially as set forth.

10. In a register the combination with a plurality of keys, of a coupler to which the keys become locked as soon as displaced from their normal position, said coupler being movable up and down with said keys throughout their limit of play, substantially as set forth.

11. In a register the combination of a plurality of keys, of a coupler to which the keys become locked as soon as displaced from their normal position, said coupler being movable up and down with said keys throughout their limit of play, and an arrester for compelling the displaced keys to make a complete stroke before returning to their normal position, substantially as set forth.

12. In a register, the combination with a plurality of keys, of a coupler with which a key may become engaged and an arrester or arresting plate controlling the movement of the key, substantially as described.

13. In a register, the combination with a plurality of keys, of a coupler with which a key may become engaged and a yielding arresting plate controlling the movement of the key, substantially as described.

14. In a register, the combination with a plurality of keys, of a coupler with which a key may become engaged, an arrester or arresting plate for controlling the movement of the key and means for moving the coupler from the key or keys at the completion of its or their stroke, substantially as described.

15. In a register, the combination with a plurality of keys, of a pair of arms, a coupler bar pivoted in said arms, and adapted to gravitate into engagement with a key or keys upon the movement of its arms, and a cam for removing the coupler bar from engagement with the key or keys, substantially as described.

16. The combination with a movable key, of a coupler having two portions, one to be engaged by the key as it is moved and the other to be moved under the key upon the movement of the coupler and an arrester for insuring a complete stroke of the key, substantially as described.

17. The combination with a plurality of keys a movable indicator and means for holding the indicator in its adjusted position, of a coupler with which a key may become engaged, an arrester for insuring a complete stroke of the key and connections with said arrester for releasing the indicator from its adjusted position, substantially as described.

18. The combination of a plurality of keys, a bar or frame common to and movable with the keys, to which displaced keys become automatically connected, and means co-operating with said bar or frame to compel a full movement of it in one direction and thereby a full stroke of an operated key, substantially as described.

19. The combination of a plurality of keys, a bar or frame common to and movable with the keys, to which displaced keys become automatically connected, and means co-operating with said bar or frame to compel a full movement of it in each direction and thereby a full stroke of an operated key in each direction, substantially as described.

20. The combination of a plurality of keys, a bar or frame common to and movable with the keys throughout their strokes, and means for compelling a full movement of said bar or frame when displaced from normal position by the starting of a key, substantially as described.

21. The combination of a plurality of keys and a key-coupler to which successively started keys may become coupled and caused to move together, substantially as described.

22. The combination of a plurality of keys divided into separate sets representing different denominations, and a key-coupler common to all of the sets, to which successively started keys in different sets may become coupled and caused to move together, substantially as described.

23. The combination of a plurality of keys divided into separate sets, a movable bar or frame common to all of the sets, and a plurality of coupling devices, one for each set of keys, carried by said movable bar or frame and by means of which successively operated keys in the several sets may become attached to said bar or frame and caused to move together, substantially as described.

24. The combination of a plurality of keys divided into separate sets, a movable bar or frame common to all of the sets, and a plurality of coupling bars, one for each set of keys, pivoted in said frame and arranged to co-operate with recesses in the keys, whereby successively operated keys in the several sets may become attached to the movable bar or frame and caused to move together, substantially as described.

25. The combination of a plurality of keys, a key-coupler to which successively started keys may become attached, and means for preventing slightly displaced keys from returning to normal position, substantially as described.

26. The combination of a plurality of keys, a key-coupler to which successively displaced keys may become attached, and means applied to said coupler for preventing its return to normal position when slightly displaced therefrom by the starting of a key, substantially as described.

27. The combination of a plurality of keys divided into sets, a movable bar or frame common to all the sets, a plurality of coupling devices, one for each set of keys, carried by said movable frame and by which successively started keys in the several sets may become attached to said frame, and means for preventing slightly displaced keys from returning to normal position, substantially as described.

28. The combination of a plurality of keys divided into sets, a movable bar or frame common to all the sets, a plurality of coupling bars, one for each set of keys, pivoted in said movable frame and adapted to co-operate with recesses in the keys, by which successively started keys in the several sets may become attached to the frame, and means applied to said frame for preventing its return to normal position after being slightly displaced therefrom by the starting of a key, substantially as described.

29. The combination of a plurality of keys, an indicator, a plurality of intermediate rods common to said indicator, and a supporting wing, substantially as described.

30. The combination of a plurality of keys, an indicator, a plurality of intermediate rods of graduated lengths and common to said indicator, and a supporting wing, substantially as described.

31. The combination of a plurality of keys, a spirally rotative indicator, a plurality of intermediate rods of graduated lengths, a plate interposed between the ends of the rods and the indicator, and a supporting wing, substantially as described.

32. The combination of a plurality of keys, a registering device, an actuating bar therefor operated by the keys, a clutch normally engaged and interposed between the actuating bar and the register, and an automatically operating disengaging device for the clutch, substantially as described.

33. The combination of a plurality of keys, two or more sets of registering devices, an actuating bar for each of said devices operated by the keys, a clutch normally engaged and interposed between each actuating bar and its registering device and an automatically operated disengaging device for the clutches, substantially as described.

34. The combination of a plurality of keys, a registering device, a clutch normally engaged and interposed between said registering device and its prime mover, an oscillating rod and connections between the same and a part of the clutch, substantially as described.

35. The combination of a plurality of keys, two or more sets of registering devices, a clutch normally engaged and interposed between each of said registering devices and their prime movers, an oscillating rod and connections between the same and a part of each of the clutches, substantially as described.

36. The combination of a plurality of keys, a registering device, a clutch normally engaged and interposed between said registering device and its prime mover, a movable bar common to the keys and connected to an oscillating rod and connections between the same and a part of the clutch, substantially as described.

37. The combination of a key, a registering device, a clutch interposed between said registering device and its prime mover, an oscillating rod carrying a cam, a longitudinally sliding rod connected with a part of the clutch and operated by said cam, substantially as described.

38. The combination of a pivoted key, a registering device, a clutch interposed between said registering device and its prime mover, an oscillating rod forming the fulcrum for the key and connections between said rod and a part of the clutch, substantially as described.

In witness whereof I have hereunto set my hand in the presence of two witnesses.

CHAS. A. JUENGST.

Witnesses:
   ODLE CLOSE,
   ODLE J. WHITLOCK.